United States Patent

[11] 3,543,689

[72] Inventor Clarence A. Dehne
        Farmington, Michigan
[21] Appl. No. 792,048
[22] Filed Jan. 17, 1969
[45] Patented Dec. 1, 1970
[73] Assignee Jervis B. Webb Company
        a corporation of Michigan

[54] CONVEYOR AND DRAGLINE CHAIN
    17 Claims, 3 Drawing Figs.
[52] U.S. Cl. .................................... 104/172,
                                                 198/189
[51] Int. Cl. .................................... B65g 17/38
[50] Field of Search ............................ 104/172;
                    74/248, 249, 250; 198/189; 59/78

[56]            References Cited
            UNITED STATES PATENTS
2,689,036  9/1954  Mullen et al. .................. 198/170

3,389,662  6/1968  Jacoby .......................... 104/172
3,457,721  7/1969  Trudeau ......................... 198/189

*Primary Examiner*—Arthur L. La Point
*Assistant Examiner*—Robert Saifer
*Attorney*—Farley, Forster and Farley ABSTRACT: A chain of the type composed of alternate pin-connected center links and pairs of side links has side links each formed with a flat outer face and the center links each formed with a transverse U-shaped recess. When the chain is assembled, the outer face of the base of the recess of a center link is coplanar with the outer faces of adjacent side links on one side of the chain and the ends of the legs of the center link recess are coplanar with the outer faces of adjacent side links on the other side of the chain. A center link may be assembled to adjacent pairs of side links with the recess facing either side of the chain and may function as a pusher element engageable with a member to be propelled by the chain.

Patented Dec. 1, 1970
3,543,689
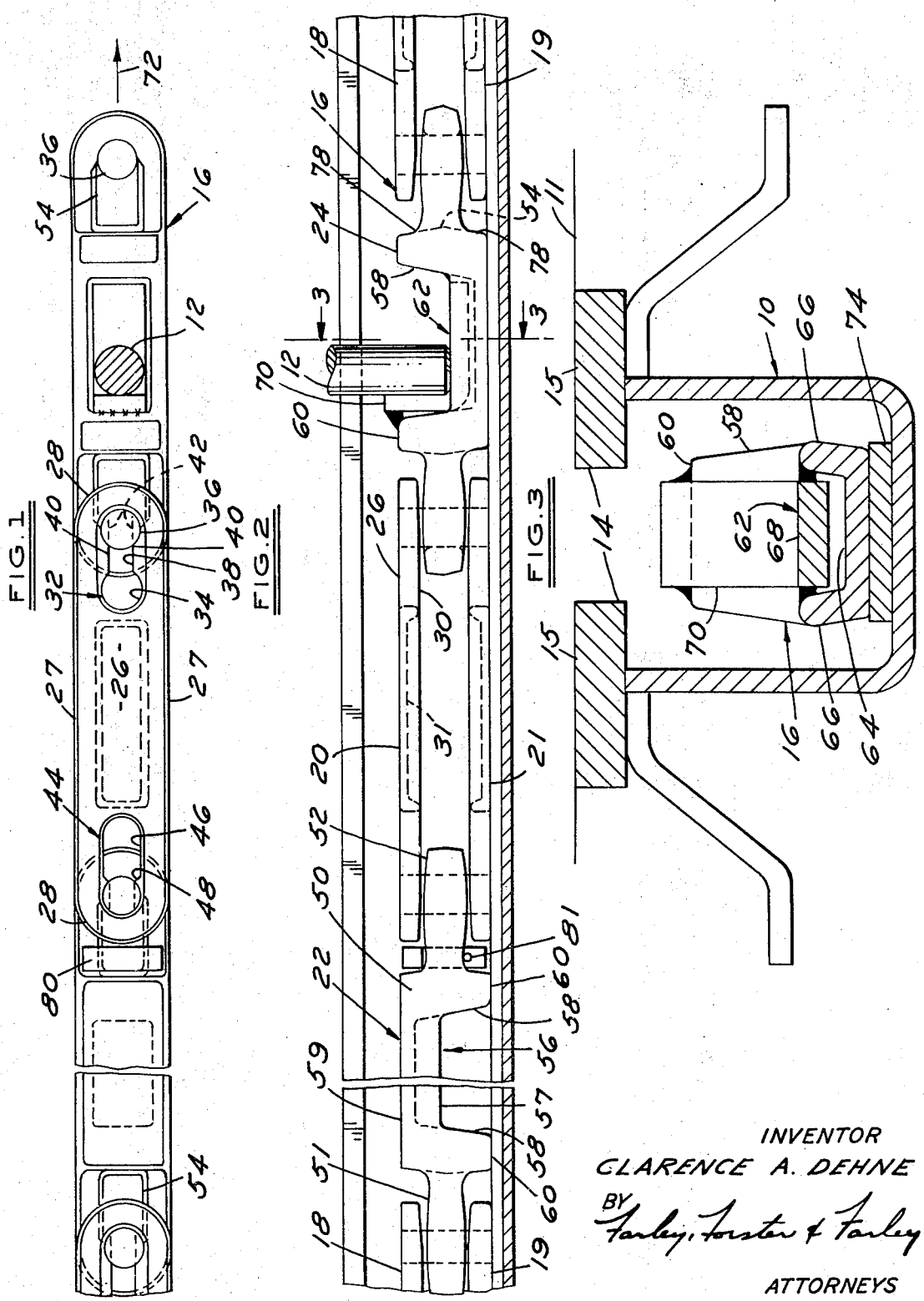
INVENTOR
CLARENCE A. DEHNE
BY
Farley, Forster & Farley
ATTORNEYS 3,543,689

CONVEYOR AND DRAGLINE CHAIN

BACKGROUND OF THE INVENTION

1. Field of the Invention

This invention relates to an improved construction for a sprocket chain of the type having detachable links formed by alternate center links and pairs of side links connected by removable chain pins. Chains of this type are widely used for conveyors and draglines.

2. Description of the Prior Art

Chain of the present type, originally disclosed in U.S. Pat. No. 870,704 to Weston, has been widely used over the years in conveyors. In some applications the chain is suspended from trolleys; while in others, the chain rests directly upon a supporting and guiding track which in many cases is located below the object being conveyed and the chain tends to become clogged with debris. Where the chain has been employed as a drag line — for example, to engage and propel a tow pin of a floor truck as illustrated in U.S. Pat. No. 2,621,610 — the chain is suspended from special trolleys equipped with tow pin engaging pushing and holdback dogs. Recently, specialized chains have been developed for drag line installations, such as illustrated in U.S. Pats. Nos. 3,265,013 and 3,389,662, these specialized chains having pusher elements incorporated as part of the chain structure in order to meet a demand for a so-called "low profile" dragline which can be installed at a lesser depth below the surface on which the floor trucks travel. These specialized chains do not offer the simplicity and ruggedness of construction of the Weston type of chain.

One feature of the Weston chain which is sometimes a disadvantage is that the chain links must be moved out of a position of relative longitudinal alinement for purposes of assembly or disassembly, and special provision must be made, particularly in dragline installations, to permit the necessary chain movements for assembly and disassembly.

The general objects of the present invention are to provide an improved chain construction having greater versatility for conveyor applications, having a relatively good self-sealing action against dirt and debris when exposed thereto, having the ability to be employed as a dragline chain of the low profile type, and capable of assembly and disassembly without displacing the chain links from a relatively longitudinally alined position.

SUMMARY OF THE INVENTION

The invention provides a conveyor chain of the type composed of alternate center links and pairs of side bars pivotally connected by chain pins wherein each side bar is formed with a substantially planar outer surface extending between the side and end edges of the side bar and with a chain pin receiving aperture adjacent each end; and, wherein each center link has a center portion and a pair of end portions, the center portion including a base and a pair of legs forming a transverse U-shaped recess, the outer surface of the base of the center portion being substantially coplanar with the outer surface of one of the pair of side bars, and each end portion of the center link being proportioned to project between a pair of side bars and having a chain pin receiving aperture for connection thereto.

All side bars are of identical construction, except for a minor modification to the chain pin receiving aperture of a pair of master side bars to facilitate assembly and disassembly; likewise, all center links are of identical construction and are symmetrical in the sense that a center link may be connected between side bars with the recessed center portion thereof facing to either side of the chain. For dragline applications, the recessed portion of the center link may serve as a pusher, or preferably, a pusher member may be mounted therein, and center links acting as pushers may be installed with the recess of the center link facing in one direction, whereas the center links not acting as pushers are installed with the recess facing in the opposite direction and form with adjacent side bars a substantially continuous outer surface of the chain between adjacent pushers.

These and other features of the invention will be more fully explained in the description to follow of the representative embodiment disclosed in the accompanying drawing illustrating the application of the improved chain construction to a floor truck dragline.

DESCRIPTION OF THE DRAWING

FIG. 1 is a plan view of the chain, showing one center link engaging a floor truck drive pin;

FIG. 2 is a side elevation of the construction of FIG. 1 including a sectional showing of a track for supporting and guiding the chain; and FIG. 3 is an enlarged sectional elevation taken on the line 3—3 of FIG. 2.

DESCRIPTION OF THE PREFERRED EMBODIMENT

The dragline construction illustrated includes a conventional chain channel or track 10 mounted below a floor surface 11 which supports trucks (not shown) each equipped with a tow pin 12 insertable within a guide slot 14 between floor plates 15 for engagement and propulsion by the chain 16 of the invention, acting as a dragline. The chain 16 is composed of pairs of side bars 18 and 19, at least one pair of master side bars 20 and 21, center links 22, and center links 24 adapted to act as pushers to engage and propel a floor truck tow pin 12.

The side bars 18 and 19 and master side bars 20 and 21 are all identical in construction with one exception to be later explained. Each of these side bars 18—21 is formed with a substantially planar outer surface 26 extending between the side edges 27 and end edges 28 thereof; while the inner side bar surface 30 may be formed with a recessed portion 31 to conserve material. A keyhole slotted aperture 32 is formed at one end of each of the master side bars 20 and 21 and at both ends of each of the other side bars 18 and 19. Each of these apertures 32 includes a circular portion 34 through which a cylindrical chain pin 36 may be inserted, and a slotted portion 38 defined by inwardly projecting shoulders 40 which engage recesses or notches 42 formed adjacent each end of the chain pin 36, all chain pins being identical. Each of the master side bars 20 and 21 is provided at the other end with a modified chain pin receiving aperture 44 having a chain pin inserting portion 46 which is elongated relative to the length of the shouldered portion 48.

Each of the center links 22 and 24 are of the same basic construction, having a center portion 50 and a pair of identical end portions 51 and 52. Each of the end portions 51 and 52 includes an aperture 54 for receiving one of the chain connecting pins 36. The center portion 50 of each center link has a transverse U-shaped recess 56 defined by a base 57 and a pair of legs 58 preferably proportioned so that when a center link is assembled to a pair of adjacent side bars, the outer surface 59 of the base 57 is coplanar with the outer surface 26 of one of the pair of adjacent side bars and the outer surfaces 60 of the legs 58 are coplanar with the outer surface 26 of the other of the pair of adjacent side bars.

As shown in FIG. 2, the end portions 51 and 52 of the center link extend symmetrically between the outer surfaces 59 and 60 of the center portion 50 so that a center link may be assembled to the side bars with the U-shaped recess thereof facing in the direction of either side bar of a pair. This enables a center link to be selectively positioned so that the recess 56 thereof can be employed as a pusher means for engaging a driving member on a load carrier, or so that some form of attachment can be secured to selected center links of the chain.

An attachment in the form of a pusher member 62 is shown secured to the center portion of the center link 24 in FIGS. 2 and 3, the recessed portion 56 of this center link forming a means for mounting the attachment 62 thereon. As best shown in FIG. 3, the recess 56 of the center link includes a central depression 64 extending along the longitudinal center line of the link between the legs 58 of the recess and bordered by side flanges 66. The pusher attachment 62 is an L-shaped member having a base 68 extending along the base 57 of the recess 56 within the depression 64, and a leg 70 adjacent one of the legs 58 of the recess 56 and projecting outwardly beyond the outer surface 60 thereof.

When the chain is used as a dragline for propelling carriers equipped with a tow pin 12 as illustrated, selected center links of the chain are preferably equipped with a pusher attachment 62 and are mounted so that the recess thereof and pusher attachment mounted therein face upwardly toward the tow pin guide slot 14. Other, nonpusher center links 22 are mounted in reverse relation with respect to the direction in which the U-shaped recess 56 faces. Thus along the length of chain between pusher center links 24, the outer surface 26 of the side bars on the upper side of the chain and outer surface 59 of the base of the center links 22 form a substantially continuous surface which a tow pin 12, lowered into the guide slot, will slidably contact until engaged by a pusher center link 24 as the chain moves in the direction of the arrow 72. Such engagement is insured by the fact that the upwardly projecting pusher member leg 70 extends beyond the outer surface of the chain on which the tow pin 12 has been supported. When the tow pin 12 drops into the recess of a pusher link 24, the forward leg 58 of the recess acts as a hold-back surface.

In the construction shown, the improved chain slidably engages a wear plate 74 of the chain track 10, and the reverse mounting of the nonpusher center links 22 reduces the area of such engagement.

Except for the master side bars 20 and 21, the side bars 18 and 19 and center links of the chain are assembled while positioned at an angle of approximately 90° between a center link and a pair of side bars. In this position the circular portion 34 of the side bar apertures 32 can be alined with one of the center line apertures 54, a chain pin 36 inserted, and the side bars then moved to engage the notches 42 of the chain pin with the shoulders 40 of the side bar apertures. When the side bars and center links are then moved to a position of longitudinal alinement as shown in FIG. 1, shoulders 78 formed by the legs 58 of the center link prevent sufficient relative telescoping movement between a center link and pair of side bars to permit a chain pin 36 to become disengaged from the shoulders 40 of the side bar apertures.

The master side bars 20 and 21 may be assembled with the side bars and center links in longitudinal alinement because the shouldered portions 48 of the apertures 44 thereof are relatively shorter and permit the insertion of a chain pin through the side bar and center link apertures when the side bars and center links are telescoped longitudinally. After the master chain pin has been so inserted, the master side bars and adjacent center link are moved to the position shown in FIG. 1 and a T-shaped retainer member 80 is inserted in the aperture of the adjacent center link to limit such telescoping movement. The retainer 80 is secured in position by a transverse pin 81 (FIG. 2), and may be removed whenever it is desired to disassemble the chain.

While the chain has been illustrated in its application to a floor truck dragline system, those skilled in the art will readily appreciate that the chain can be employed in various other ways with advantages not obtainable by present forms of chain commercially available.

I claim:

1. In a conveyor chain of the type composed of alternate center links and pairs of side bars pivotally connected by chain pins, the improvement wherein each side bar is formed with an outer surface extending between the side and end edges of the side bar and with a chain pin receiving aperture adjacent each end; each center link having a center portion and a pair of end portions, the center portion including a base and a pair of legs forming a transverse U-shaped recess, each end portion being integral with a leg and proportioned to project between a pair of side bars and including a chain pin receiving aperture for connection thereto, and the outer surface of the base of the center portion being substantially coplanar with the outer surface of one of said pair of side bars.

2. A conveyor chain according to claim 1 wherein the end surfaces of the legs of the center portion of the center link are substantially coplanar with the outer surface of the other of said pair of side bars.

3. A conveyor chain according to claim 1 wherein the transverse U-shaped recess of at least certain of said center links forms pusher means.

4. A conveyor chain according to claim 3 wherein said certain center links having the transverse recess thereof forming pusher means are mounted in reverse relation to other nonpusher center links of the chain with respect to the direction in which the U-shaped recesses of the pusher and nonpusher center links face.

5. A conveyor chain according to claim 1 wherein a pusher member is secured to the center portion of at least one center link within the U-shaped recess thereof.

6. A conveyor chain according to claim 5 wherein the pusher member projects outwardly beyond the outer surfaces of the other of said pair of side bars.

7. A conveyor chain according to claim 5 wherein a center link to which the pusher member is secured is mounted in reverse relation to a center link to which no pusher member is secured with respect to the direction in which the U-shaped recesses of the pusher and nonpusher center links face.

8. A conveyor chain according to claim 5 wherein the pusher member has a base portion extending along the base of the center portion of the center link and a leg adjacent one of the legs of said center portion.

9. A conveyor chain according to claim 8 wherein the base of the center portion has a depression in which the base portion of the pusher member is positioned.

10. A conveyor chain according to claim 1 having and retaining least one pair of master side bars each provided with a keyhole-type slot having an apertured portion through which a master chain pin can be inserted and removed and a shouldered portion, a master chain pin having a recess engageable with the shouldered portion, a master chain pin having a recess engageable with the shouldered portion, the apertured portion being elongated relative to the length of the shouldered portion and to the transverse dimension of the chain pin to permit disengagement of the chain pin from the shouldered portion by telescoping movement between the pair of master side bars and the adjacent center link connected thereto by the master chain pin, and retaining means attachable to the chain to limit such telescoping movement and prevent such disengagement of the master chain pin.

11. In a conveyor chain of the type composed of alternate pin-connected center links and pairs of side links, the improvement wherein each center link has a center portion including a base and a pair of legs forming a V-shaped recess extending transversely of the longitudinal center line of the center link and a pair of end portions integral with said leg portions, each end portion being adapted to project between a pair of side links and having a pin-receiving aperture.

12. A conveyor chain according to claim 11 wherein a chain attachment is secured to the center portion of the center link.

13. A conveyor chain according to claim 12 wherein the chain attachment is mounted in the recess of the center link.

14. A conveyor chain according to claim 11 wherein the recess forms a means for mounting an attachment on the center link.

15. A conveyor chain according to claim 11 wherein the legs of the recess provide pusher and hold-back means for an object to be propelled by the chain.

16. A conveyor chain according to claim 11 wherein the base of the center portion includes a depression extending along the longitudinal center line of the link between the legs of the center portion.

17. A conveyor chain according to claim 11 wherein the legs of the center portion serve to position a chain attachment member longitudinally of the center link, and means on the recess for positioning such attachment member transversely of the center link.

PO-1050
(5/69)

UNITED STATES PATENT OFFICE
CERTIFICATE OF CORRECTION

Patent No. 3,543,689      Dated December 1, 1970

Inventor(s) Clarence A. Dehne

It is certified that error appears in the above-identified patent and that said Letters Patent are hereby corrected as shown below:

Column 1, line 33, change "alinement" to --alignment--.

Column 1, line 44, change "alined" to --aligned--.

Column 3, line 33, change "alined" to --aligned--.

Column 3, line 38, change "alinement" to --alignment--.

Column 3, line 44, change "alinement" to --alignment--.

Column 4, line 33, change "and" to --at--.

Column 4, line 34, cancel "retaining".

Column 4, lines 38 and 39, delete the phrase "a master chain pin havi a recess engageable with the shouldered portion"

Column 4, line 52, change "V" to --U--.

Signed and sealed this 30th day of March 1971.

(SEAL)
Attest:

EDWARD M. FLETCHER, JR.          WILLIAM E. SCHUYLER, JR.
Attesting Officer                  Commissioner of Patents